(12) United States Patent
Mills

(10) Patent No.: US 8,740,302 B2
(45) Date of Patent: *Jun. 3, 2014

(54) MULTI-USE PROTECTIVE COVER

(71) Applicant: Ginelle Mills, Walnut Creek, CA (US)

(72) Inventor: Ginelle Mills, Walnut Creek, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/775,052

(22) Filed: Feb. 22, 2013

(65) Prior Publication Data

US 2013/0270882 A1 Oct. 17, 2013

Related U.S. Application Data

(63) Continuation-in-part of application No. 12/748,299, filed on Mar. 26, 2010, now Pat. No. 8,382,201.

(60) Provisional application No. 61/163,568, filed on Mar. 26, 2009.

(51) Int. Cl.
A47C 31/02 (2006.01)
A47C 31/11 (2006.01)
A47D 1/10 (2006.01)

(52) U.S. Cl.
USPC .................... 297/219.12; 297/256.17

(58) Field of Classification Search
USPC ....................... 297/219.12, 256.17
See application file for complete search history.

(56) References Cited

U.S. PATENT DOCUMENTS

| 4,325,578 | A | * | 4/1982 | Borucki ................. 297/281 |
| 4,666,207 | A | * | 5/1987 | Quartano ............ 297/219.12 X |
| 5,533,934 | A | * | 7/1996 | Miller ..................... 472/118 |
| 5,547,250 | A | * | 8/1996 | Childers .................. 297/256.17 |
| 5,588,699 | A | * | 12/1996 | Rundle et al. .............. 297/488 X |
| 5,678,888 | A | * | 10/1997 | Sowell et al. ............. 297/256.17 |
| 5,735,576 | A | * | 4/1998 | Pepys et al. ........... 297/219.12 X |
| 6,206,471 | B1 | * | 3/2001 | McGowan ............... 297/256.17 |
| 6,237,998 | B1 | * | 5/2001 | Aprile .................. 297/219.12 |
| 6,511,123 | B1 | * | 1/2003 | Sitarski et al. ............. 297/229 X |
| 6,648,411 | B2 | * | 11/2003 | Julien ..................... 297/274 |
| 6,659,564 | B2 | * | 12/2003 | Kassai et al. ............ 297/250.1 X |
| 6,752,457 | B2 | * | 6/2004 | Gold et al. ............... 297/219.12 |
| 6,848,743 | B1 | * | 2/2005 | Collins .................... 297/256.17 |
| 6,851,749 | B2 | * | 2/2005 | Norman .................. 297/256.17 |
| 6,860,555 | B2 | * | 3/2005 | Kassai et al. ............. 297/219.12 |
| 6,926,359 | B2 | * | 8/2005 | Runk ..................... 297/219.12 |
| D513,146 | S | * | 12/2005 | Griffin .................... D6/611 |
| 7,175,535 | B1 | * | 2/2007 | Marmentini .............. 297/273 X |
| 7,367,621 | B1 | * | 5/2008 | Han-Dressor et al. ... 297/256.17 |
| 7,410,213 | B1 | * | 8/2008 | Ferrari-Cicero et al. 297/219.12 |
| 7,677,661 | B1 | * | 3/2010 | Ferrari-Cicero et al. 297/219.12 |
| 7,878,587 | B1 | * | 2/2011 | Leach .................... 297/219.12 |
| 8,382,201 | B2 | * | 2/2013 | Mills .................... 297/219.12 |
| 2001/0048235 | A1 | * | 12/2001 | Hartranft ................. 297/219.12 |
| 2004/0066070 | A1 | * | 4/2004 | Sampson et al. ......... 297/256.17 |

(Continued)

*Primary Examiner* — Rodney B White

(74) *Attorney, Agent, or Firm* — Stuart J. West; Shaun Sluman; West & Associates, A PC

(57) ABSTRACT

A safety device for children, specifically a cover for use with a variety of surfaces that provides a barrier to protect a child from the heat and/or contamination of a surface. In some embodiments, the device can prevent a child from being burned or uncomfortable by the heat of a swing seat or car seat by minimizing thermal transfer between a child's skin and the swing seat for an adequate amount of time. In some embodiments, the cover can be used in a planar configuration as a changing pad or play mat.

14 Claims, 11 Drawing Sheets

(56) References Cited

U.S. PATENT DOCUMENTS

| | | | |
|---|---|---|---|
| 2007/0102079 A1* | 5/2007 | Billock | 150/154 |
| 2008/0079297 A1* | 4/2008 | Braxton Perry | 297/219.12 |
| 2008/0136231 A1* | 6/2008 | Doherty | 297/219.12 |
| 2008/0258528 A1* | 10/2008 | Bush et al. | 297/256.17 |

* cited by examiner

MULTI-USE PROTECTIVE COVER

CLAIM OF PRIORITY

This application is a continuation-in-part of United States Non-Provisional patent application Ser. No. 12/748,299, filed Mar. 26, 2010 now U.S. Pat. No. 8,382,201 B2, which claimed the benefit of U.S. Provisional Patent Application No. 61/163,568, filed Mar. 26, 2009, and the complete contents of both are hereby incorporated by reference.

BACKGROUND

1. Field of the Invention

The present disclosure relates to the field of protective equipment for children, specifically a cover that can be used as a protective barrier between a child and a hot and/or unsanitary surface.

2. Background

Each day, children come into contact with multiple surfaces, whether they are at home, in restaurants, on playgrounds, in parks, at school, or in cars. However, the surfaces on which children sit or play are often soiled, germ-filled, and/or too hot for a child's delicate skin. Thus, it is often necessary to cover surfaces with a protective barrier to shield a child and protect their skin and health. However, many protective products are not designed for use outdoors, over surfaces that become extremely hot, and/or are difficult to clean. Moreover, many products that are currently on the market are unable to be configured for various uses, such as for use with bucket swing seats, high chairs, stroller, car seats, and shopping carts. Therefore, it is necessary to buy multiple products for each individual use. Additionally, many products on the market are not adapted for use as changing pads or play mats, and/or they are multi-part designs rather than one-piece products.

What is needed is a portable protective cover that can be used in a variety of applications. The cover should be lightweight, easy to clean, and in some embodiments should be a single unit having insulating properties to minimize thermal transfer between a hot surface and a child's skin for an adequate amount of time. The cover should be adapted to substantially conform to the interior surface geometry of a bucket-style swing seat, a high chair, and various other child seats. The cover should also be adapted for use as a changing pad and play pad. In some embodiments, the protective cover should also adequately shield all parts of a child's body that would normally come into contact with a swing seat or high chair seat without a cover. In some embodiments, the cover should be disposable after a single use.

BRIEF DESCRIPTION OF THE DRAWINGS

FIG. 5A depicts a top view of an embodiment of a cover having markings.

DETAILED DESCRIPTION

Figure 1A:
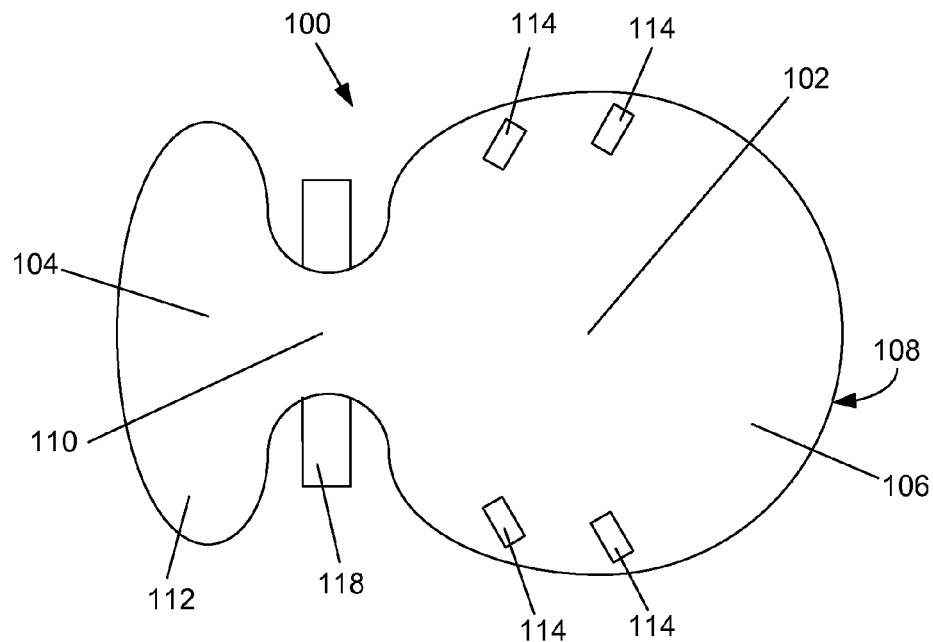
FIG. 1A depicts a top view of a first embodiment of a cover.
Figure 1B:
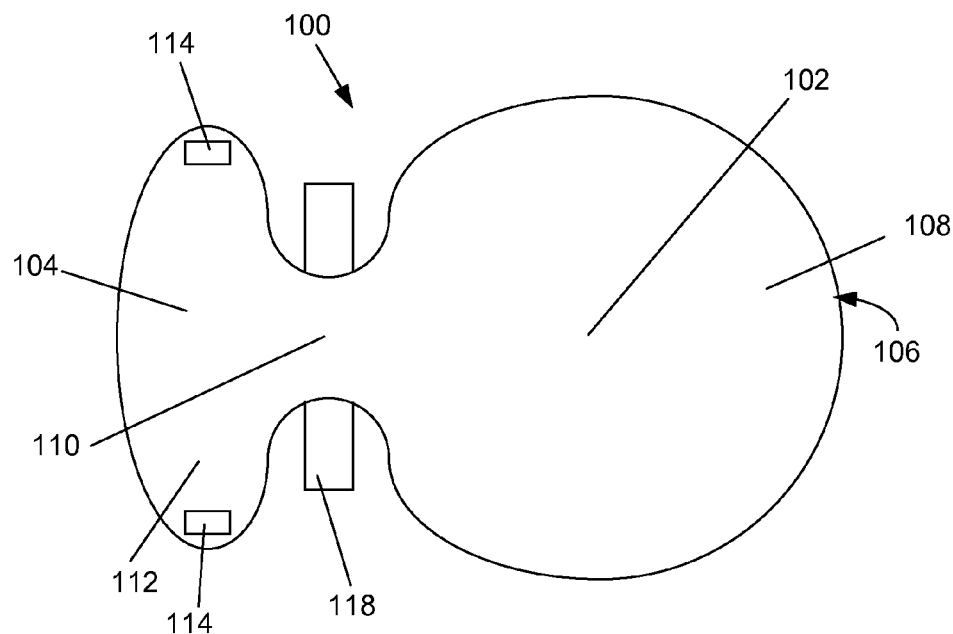
FIG. 1B depicts a bottom view of a first embodiment of a cover.

FIGS. 1A-1B respectively depict top and bottom views of an exemplary embodiment of a cover 100 in a fully extended, open position. The cover 100 can be a substantially planar member having a body section 102 and one or more extension members 104. The cover 100 can have a top surface 106 and a bottom surface 108.

Figure 2A:
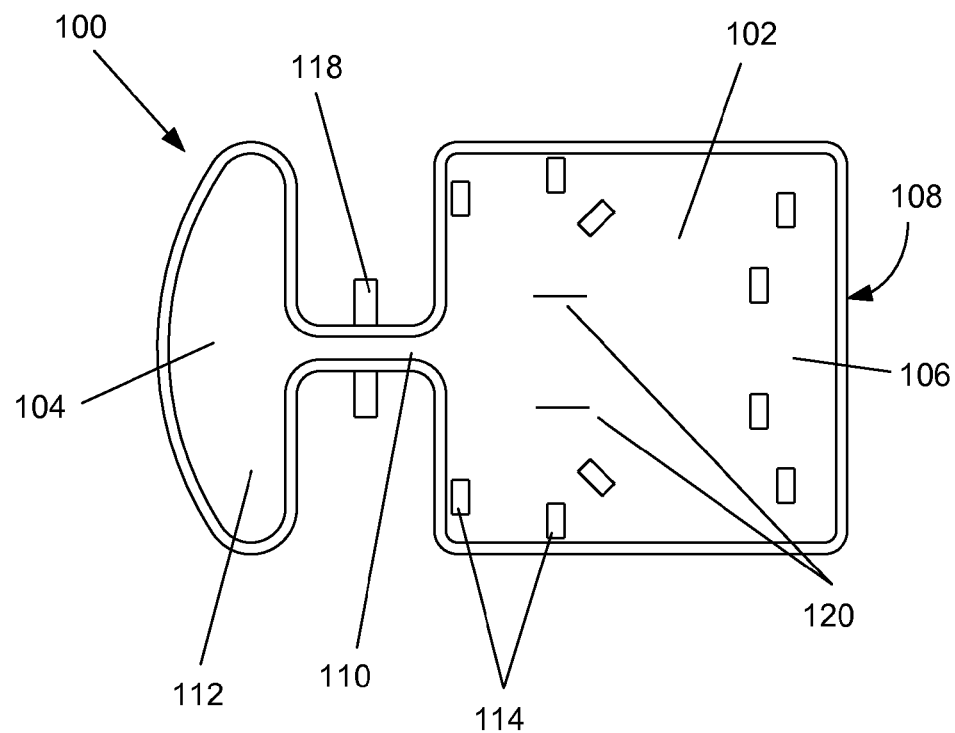
FIG. 2A depicts a top view of a second embodiment of a cover.
Figure 2B:
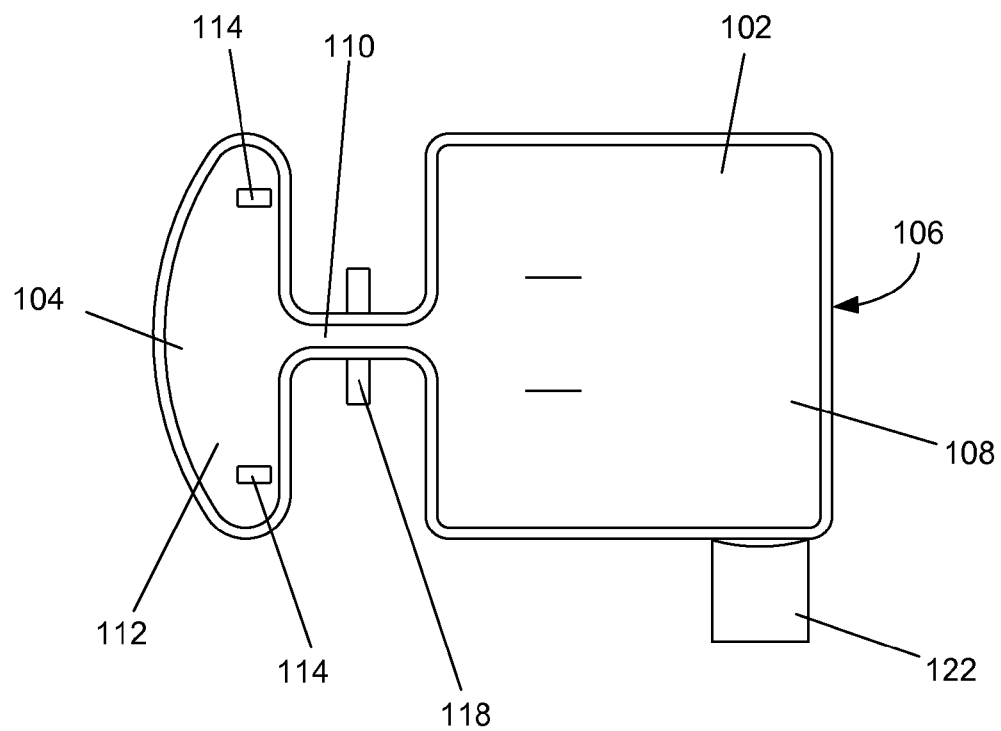
FIG. 2B depicts a bottom view of a second embodiment of a cover.

In some embodiments, the body section 102 can have a rounded, substantially circular shape, as shown in FIGS. 1A and 1B. In alternate embodiments, the body section 102 can have a substantially rectangular shape, as shown in FIGS. 2A and 2B. In still other embodiments, the body section 102 can be oval, triangular, hexagonal, polygonal, or have any other desired shape. By way of a non-limiting example, the body section 102 can have the shape depicted in FIG. 3.

The extension members 104 can extend out from perimeter edges of the body section 102. In some embodiments, the extension members 104 can be integral with the body section 102, such that the extension members 104 are continuous extensions of the material that comprises the body section 102, as shown in FIGS. 1A, 1B, 2A, and 2B. In other embodiments, one or more of the extension members 104 can be separate pieces permanently or removably coupled with the body section 102 via a bonding agent, stitching, sewing, fusing, adhesives, snaps, hood and loop fasteners, buttons, or any other connection mechanism. The extension members 104 can be substantially planar, and/or can lie in substantially the same plane as the body section 102 when the cover 100 is in the fully extended, open configuration shown in FIGS. 1A, 1B, 2A, 2B and 3. In alternate embodiments, at least one extension member 104 can extend from the body section 102 in any other known and/or convenient manner or from any point on the body section 102.

Figure 3:
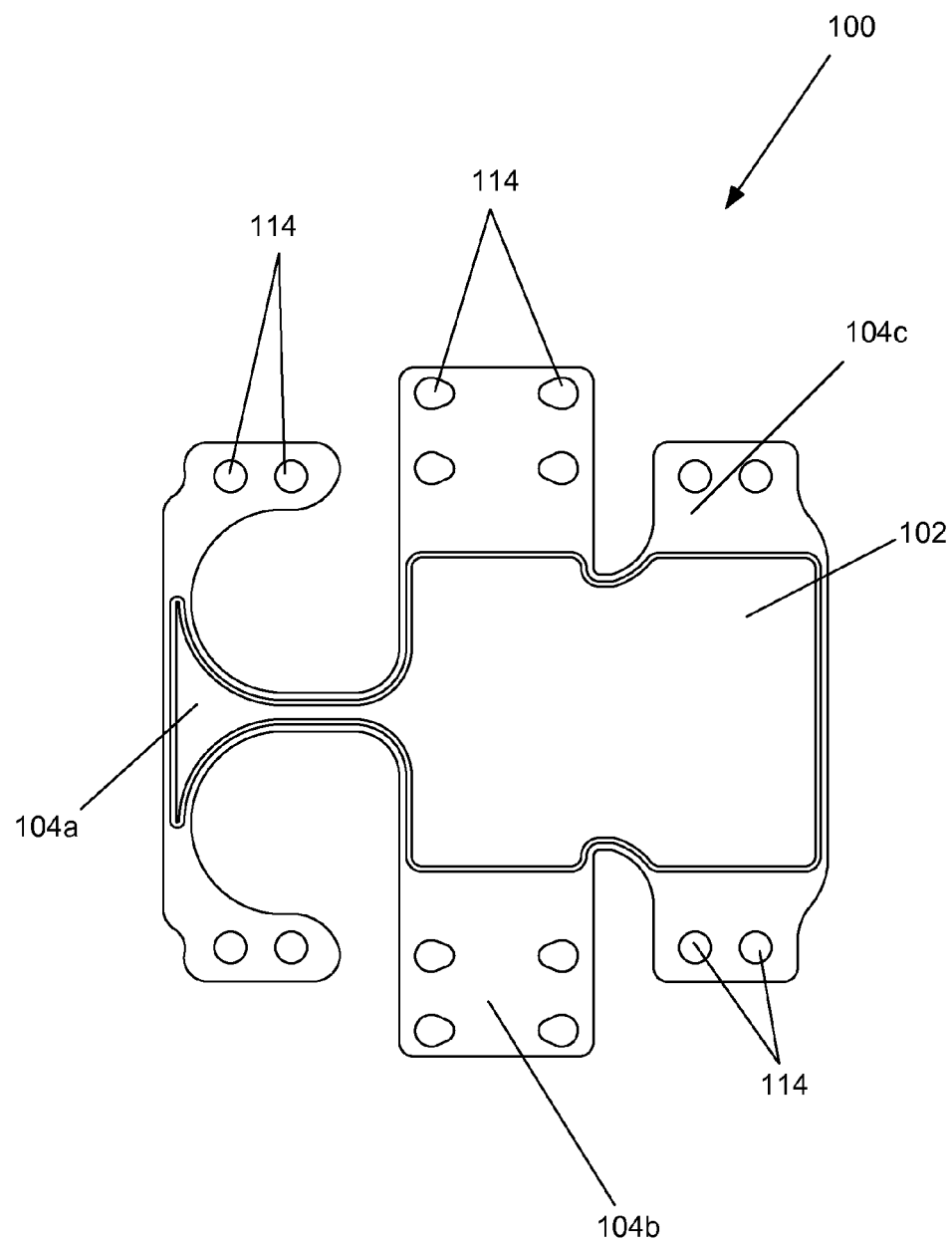
FIG. 3 depicts a top view of a third embodiment of a cover.

In some embodiments, the extension members 108 can comprise a thin section 110 and a wide section 112, such that the extension member 104 is substantially mushroom-shaped as shown in FIGS. 1A-1B and FIGS. 2A-2B. The thin section 110 can extend from an edge of the body section 102 toward the wide section 112, such that the thin portion 110 is between the wide section 112 and the body section 102. In alternate embodiments, the extension members 104 can have any other desired geometry. By way of a non-limiting example, the extension members 104 can be rectangular, curved, straight, and/or have portions of varying thickness, such as the extension members 104 depicted in FIG. 3. In some embodiments, the cover 100 can comprise a single extension member 104, as shown in FIGS. 1A, 1B, 2A, and 2B. However, in alternate embodiments the cover 100 can comprise a plurality of extension members 104, as shown in FIG. 3.

In some embodiments, the perimeter edges of the cover 100 can be coupled with piping material or any other type of decorative edge material, as shown in FIGS. 2A and 2B. In some embodiments, a perimeter edge can be semi-rigid or stiff and/or can be formable and/or elastomeric. In other embodiments, a perimeter edge can be weighted and/or can have non-skid properties.

Figure 4A:
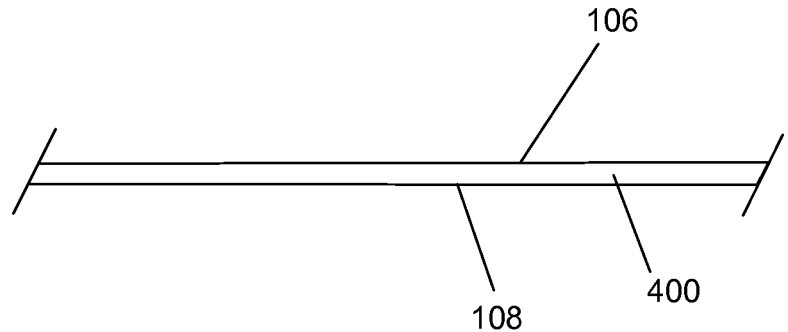
FIG. 4A depicts a partial cross-sectional view of an embodiment of a cover having one layer.
Figure 4B:
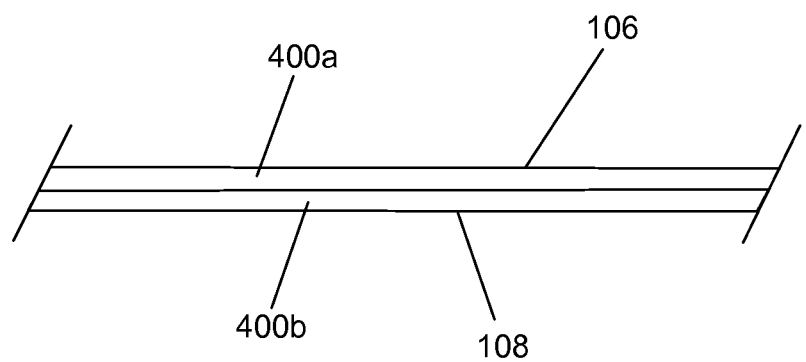
FIG. 4B depicts a partial cross-sectional view of an embodiment of a cover having two layers.
Figure 4C:
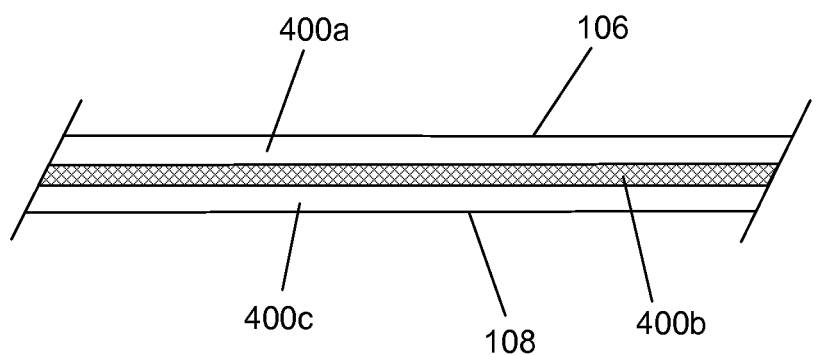
FIG. 4C depicts a partial cross-sectional view of an embodiment of a cover having three layers.

The cover 100, including the body section 102 and/or extension members 104 can comprise one or more layers 400, as depicted in the cross sections of FIGS. 4A-4C. By way of non-limiting examples, the cover 100 can have one layer 400 as shown in FIG. 4A, two layers 400 as shown in FIG. 4B, three layers 400 as shown in FIG. 4C, or any other desired number of layers 400. In the embodiment depicted in FIG. 4C, the cover 100 comprises three substantially planar layers: two outer layers 400a and 400c, and one inner layer 400b. The top side of the outer layer 400a can at least partially form the top surface 106 of the cover 100, and the underside of the outer layer 400a can be at least partially coupled with the top side of the inner layer 400b. The underside of the inner layer 400b can be at least partially coupled with the top side of the outer layer 400c, and the underside of the outer layer 400c can at least partially form the bottom surface 108 of the cover 100.

In some embodiments, the body section 102 and the extension members 104 can be integral and comprise the same one or more layers 400 made of the same materials. In other embodiments, the body section 102 and the extension members 104 can have different numbers of layers 400 and/or have layers of different materials. The extension members 104 can be any known and/or convenient color or combination of colors, and in some embodiments can be a different color or combination of colors than the body section 102.

In some embodiments, the layers 400 can be flexible, such that the cover 100 can be bent, folded, rolled, bunched-up, flattened, or otherwise be manipulated. One or more of the layers 400 can be made of woven or non-woven fabric, polymer, silicone, vinyl, paper products, nylon, oilcloth, or any other known and/or convenient material or combination of materials, and/or can be machine or hand-washable. In some embodiments, the cover 100 and/or one or more layers 400 can comprise elastomeric material, such as Lycra® or Versalloy®. In some embodiments, at least one layer 400 can be at least partially waterproof or water-resistant, and/or can be resistant to body fluids and/or substances. In some embodiments, different layers 400 can comprise different materials. By way of a non-limiting example, in the embodiment shown in FIG. 4C, the outer layer 400a can comprise woven fabric and the outer layer 400c can comprise polyester interlock fabric coated with 1-2 millimeters of polyurethane to allow for easy clean-up in case of soiling.

In some embodiments, the cover 100 and/or one or more layers 400 can comprise disposable material, such that the cover 100 or one or more layers 400 can be used once or until soiled, and then be disposed. By way of non-limiting examples, such disposable material can be paper, plastic such as polyethylene resin, or any other known and/or convenient material. In some of these embodiments, one or more layers 400 can be selectively removable from other layers 400, such that individual layers 400 can be removed and be disposed or replaced. By way of a non-limiting example, in some two layer embodiments such as the embodiment shown in FIG. 4B, the upper layer 400a can be removed from the lower layer 400b when the upper layer 400a is soiled, and a new upper layer 400b can be coupled with the lower layer 400b.

One or more of the layers 400 can have ridges, be smooth, or can have any other known and/or convenient surface characteristics. One or more of the layers 400 can have decorative prints or patterns, can be solid colors, or can have any other known and/or convenient visual properties. In some embodiments, one or more layers 400 can have intrinsic anti-bacterial properties. In other embodiments, one or more layers 400 can have anti-bacterial and/or ultraviolet protective coating. The layers 400 can be formed by injection molding or any other known and/or convenient manufacturing process.

In some embodiments, one or more of the layers 400 can be insulating layers. By way of a non-limiting example, in the embodiment depicted in FIG. 4C the inner layer 400b can be an insulating layer 400. An insulating layer 400 can comprise one or more materials that can minimize and/or reduce thermal transfer through the layer 400. By way of a non-limiting example, an insulating layer 400 can at least partially inhibit heat transfer between a surface and a child when the cover 100 is placed between the surface and the child. In some embodiments, an insulating layer 400 can be comprised of an insulating material, such as Insul-Bright® material, that comprises hollow, polyester fibers needle-punched through a nonwoven substrate and through a reflective metalized poly film. Needle-punching is the process of compacting and tying together fibers with or without a base material. Hundreds of needles can punch a sheet of processed fibers into a substrate to hold batting together. The hollow fibers can resist conduction while the reflective metalized poly film can resist radiant energy.

In alternate embodiments, an insulating layer 400 can comprise a permanent or removable pouch filled with insulating gel or any other known and/or convenient fluid with desired insulating properties. In some of these embodiments, the cover 100 can have a pocket in which the cover 100 can accept a removable pouch of insulating material. In other embodiments, an insulating layer 400 can be at least partially made of polyester film such as Mylar®, Melinex®, and/or Hostaphan®, and/or can be comprised of disposable material suitable for one-time use. In yet other embodiments, an insulating layer 400 can be suitable for multiple uses and/or temporary uses. In some embodiments, an insulating layer 400 can have a similar shape and/or thickness as other layers 400. In other embodiments, an insulating layer 400 can have geometry different from that of other layers 400.

In embodiments comprising a plurality of layers 400, the layers 400 can be coupled with each other using various methods. By way of a non-limiting example, in the embodiment shown in FIG. 4C substantially the entire underside of the outer layer 400a can be bonded to substantially the entire upper side of the insulating inner layer 400b using adhesives. Likewise, substantially the entire underside of the insulating inner layer 400b can be bonded to substantially the entire upper side of the outer layer 400c using adhesives. Adhesives can be any known and/or convenient adhesive suitable for bonding the material of the layers 400 together, such as but not limited to gel adhesive, fabric glue, fusible webbing, spray adhesive, laminate, or any other known and/or convenient bonding agent. In other embodiments, layers 400 can be coupled with each other via stitching or bonding around their respective perimeters and/or at any other known and/or convenient location on or within the layers 400 and/or the cover 100.

Returning to FIGS. 1A, 1B, 2A, 2B, and 3, in some embodiments a plurality of fastening components 114 can be coupled with the cover 100. In some embodiments, a first set of fastening components 114 can be coupled with the top surface 106 of the body section 102, as shown in FIGS. 1A and 2A, and a second set of fastening components 114 can be coupled with the bottom surface 108 of the extension member 104, as shown in FIGS. 1B and 2B. As shown in FIG. 1A, one or more fastening components 114 can be coupled with the top surface 106 of the body section 102 proximate to opposing perimeter edges of the body section 102. As shown in FIG. 1B, one or more fastening components 114 can be coupled with the bottom surface 108 of the extension member 104 on opposing sides of the wide section 112.

In alternate embodiments, the cover 100 can have any other number and arrangement of fastening components 114. By way of a non-limiting example, in the embodiment depicted in FIGS. 2A-2B, the cover 100 can have ten fastening components 114 coupled with the top surface 106 of the body section 102, and two fastening components 114 coupled with the bottom surface 108 of the extension member 104. In FIGS. 2A-2B, some of the fastening components 114 coupled with the top surface 106 of the body section 102 are positioned proximate to the perimeter edge of the body section 102, while others are positioned further toward the center of the body section 102. In still other embodiments, a plurality of fastening components 114 can be coupled with the body section 102 and/or extension member 104 in any other desired placement or configuration, such as in the configuration shown in FIG. 3.

In some embodiments, the fastening components 114 can be complementary, such that each fastening component 114 is configured to selectively mate with a corresponding fastening component 114. By way of a non-limiting example, each of the fastening components 114 on the bottom surface 108 of the wide section 112 shown in FIG. 1B can be configured to selectively mate at any one time with any one of the fastening components 114 on the upper surface 106 of the body section 102. In some embodiments, a larger number of fastening components 114 can be provided on the upper surface 106 of the body section 102 than are provided on the bottom surface 108 of the wide section 112, such that a user can select with of the fastening components 114 on the body section 102 to use. This placement of a plurality of fastening components 114 can allow the extension member 104 to be selectively and temporarily coupled with the top surface 106 of the body section 102 in multiple configurations, depending on user preference and application.

In some embodiments, the fastening components 114 can be complementary hook and loop members. In other embodiments, fastening components 114 can be snaps, apertures and protrusions, buttons, clips, magnets, or any other known and/or convenient type of fastening components or combination of types of fastening components. Moreover, in some embodiments, a cover 100 can have any other known and/or convenient number of complementary fastening components 114. For example, in the embodiment of a cover 100 depicted in FIG. 3, extension members 104a and 104c have a plurality of apertures 114, and an extension member 104b can have a plurality of protrusions 114, such that extension members 104a and 104c can be selectively mated with extension member 104b. In other embodiments, any convenient number of fastening components 114 can be located at any other known and/or convenient locations on an extension member 104 and/or body section 102, such that a cover 100 can be configured to adapt to children of different body types and/or surfaces having different geometries.

Figure 5A:
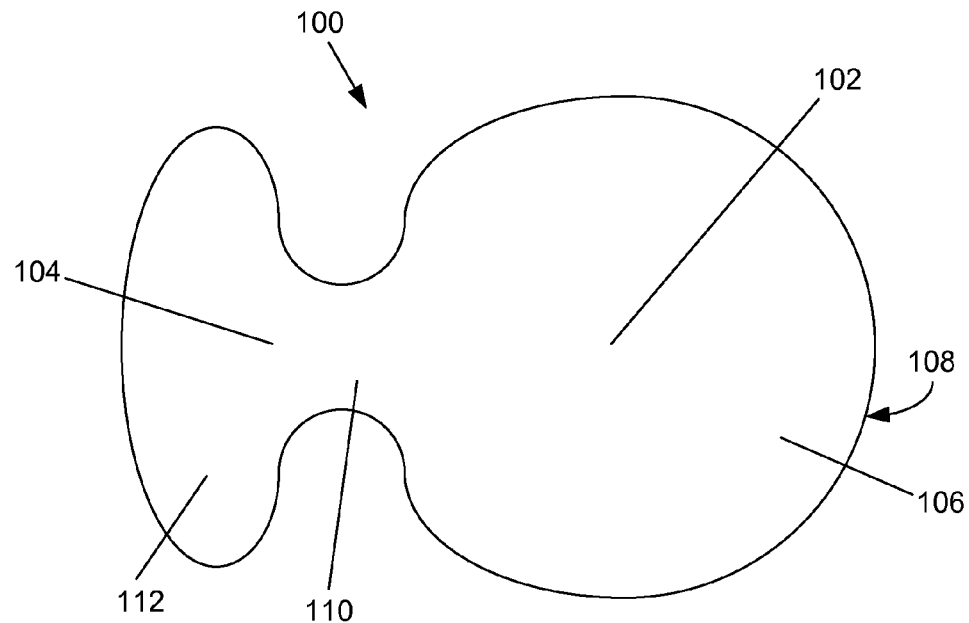
FIG. 5A depicts a top view of an embodiment of a cover in which top fastening components are absent.
Figure 5B:
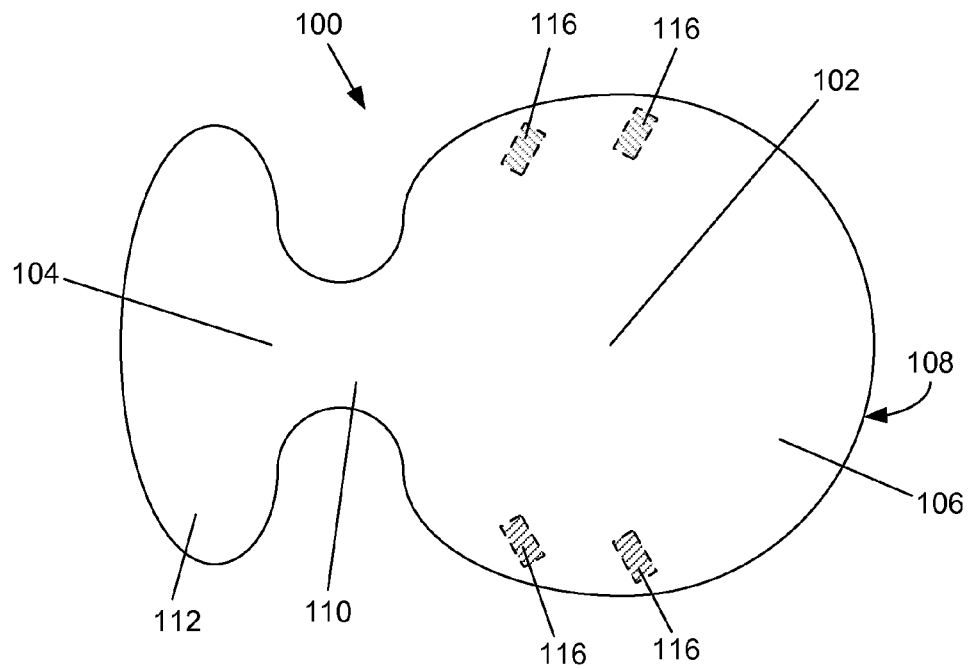

In alternate embodiments, the fastening components 114 can be non-complementary fasteners, such as reusable or single-use adhesives. In some of these embodiments, fastening components 114 can be absent from the top surface 106 as shown in FIG. 5A, such that the fastening components 114 on the bottom surface 108 of the wide section 112 can be selectively coupled with any desired position on the upper surface 106 of the body section 102. In some embodiments, indicia such as the markings 116 shown in FIG. 5B can be provided on the upper surface 106 of the body section 102 to illustrate suggested locations at which a user can choose to attach the fastening components 114 on the bottom surface 108 of the wide section 112 with the upper surface 106 of the body section 102. By way of a non-limiting example, the fastening components 114 on the bottom surface 108 of the wide section 112 can be portions of adhesive tape, such that the adhesive tape can be selectively bonded with the upper surface 106 of the body section 102 at suggested markings 116 or any other desired location.

In some embodiments, the cover 100 can comprise one or more seat fasteners 118, as depicted in FIGS. 1A, 1B, 2A, and 2B. In some embodiments, the seat fasteners 118 can be strips coupled with and extending outward from the thin section 110 of the extension member 104. In alternate embodiments, the seat fasteners 118 can be strings, cords, ropes, clips, or any other mechanism configured to be coupled with or attach around a portion of a seat or other structure. By way of non-limiting examples, in some embodiments the seat fastener 118 can be an elongated member extending through and secured by the layers 400 of the cover 100, while in other embodiments the seat fasteners 118 can be coupled with the body section 102 and/or the extension member 104 via stitching, fusing, adhesives, or any other connection mechanism.

In some embodiments, the seat fasteners 118 can have connectors, such as hook and loop fasteners, snaps, aperture and protrusions, hook and eye closures, or any other known and/or convenient type of fastening mechanism configured to selectively mate together. In other embodiments, seat fasteners 118 can be selectively tied together. The seat fasteners 118 can be secured together and/or around a separate structure, such as a portion of a child's seat, to assist in preventing slippage or excessive movement of the cover 100 when in use, as will be discussed below. In alternate embodiments, the seat fasteners 118 can be absent.

In some embodiments, fastening components 114 and/or seat fasteners 118 can be used to temporarily fasten toys, keys, and/or other accessories to the cover 100. In yet other embodiments, fastening components 114 can be mated with complementary fastening members located on a seat, stroller, or any other convenient surface such that the cover 100 can be selectively coupled with a desired surface, thereby preventing excessive movement of the cover 100 when in use.

Figure 9:
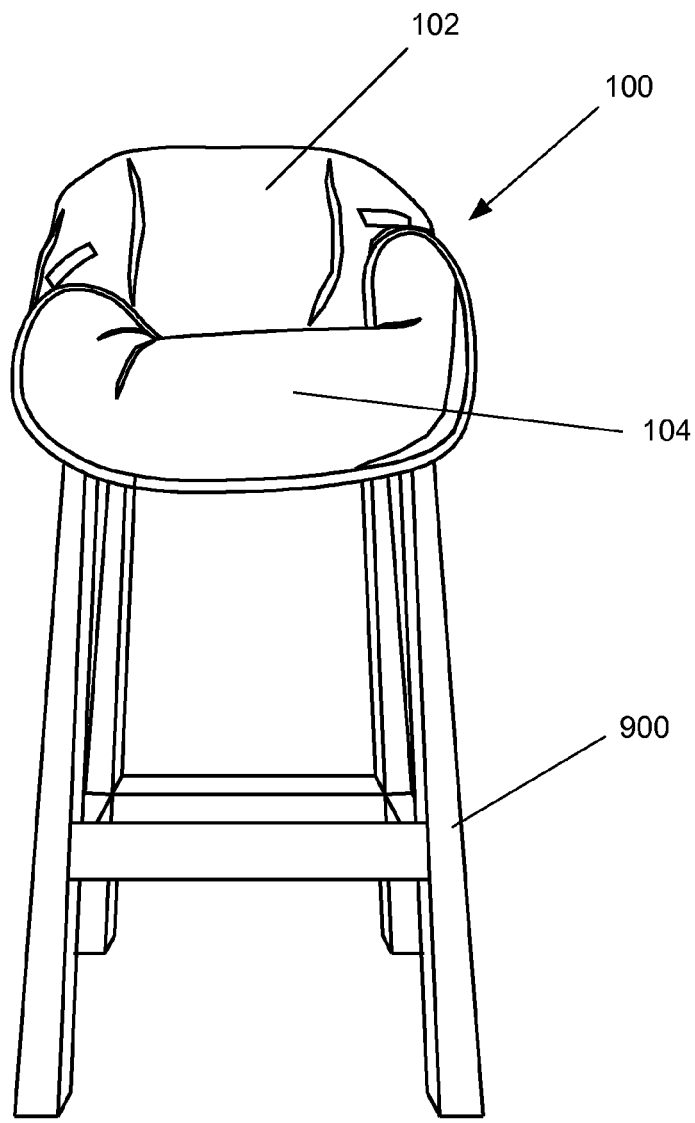
FIG. 9 depicts an embodiment of a cover in use with a high chair.

As shown in FIGS. 2A and 2B, the cover 100 can further comprise a plurality of slits 120 that can be adapted to accept high-chair safety straps, which are common on many high chairs 900 as shown in FIG. 9. Slits 120 can be positioned and have the appropriate dimensions to accommodate high chair safety straps. In some embodiments, the cover 100 can comprise more than two slits 120 to account for different high chairs 900 having safety straps in different locations.

In some embodiments, the cover 100 can further comprise a storage pocket 122, as depicted in FIG. 2B. In some embodiments, the cover 100 can be stuffed into the pocket 122, thus providing compact storage of the cover 100 when not in use. In alternate embodiments, the pocket 122 can be used to store keys, toys, pacifiers, and/or any other known and/or convenient accessory. The pocket 122 can be a separate component that can be permanently or removably attached to the cover 100, as shown in FIG. 2B, or can alternately be integral with a surface 106 or 108 of the cover 100. In still other embodiments, the cover 100 can be folded in on itself from the position shown in FIGS. 1A and 1B to form a compact configuration.

Figure 6A:
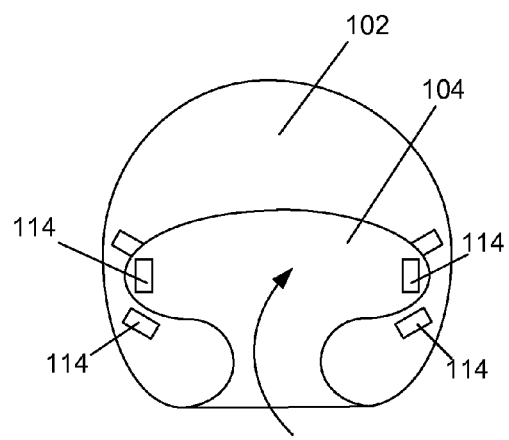
FIG. 6A-6C depict steps for one embodiment of a method for using a cover.
Figure 6B:
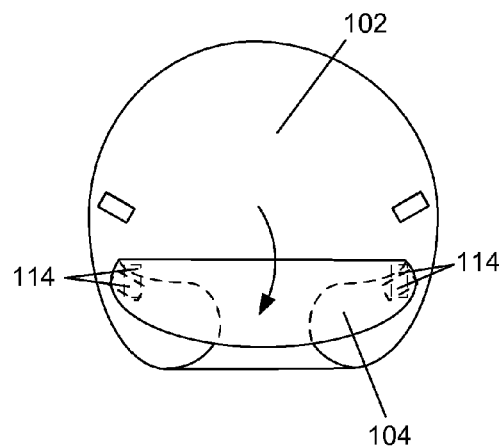
Figure 6C:
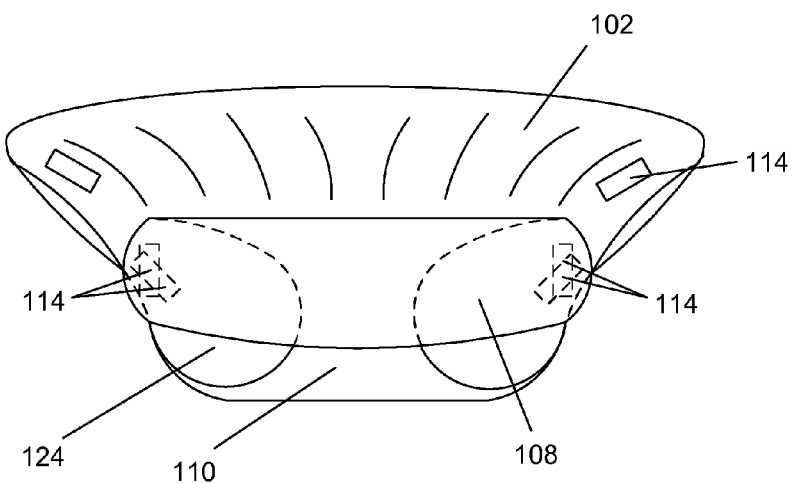

FIGS. 6A-6C depict steps of one embodiment of a method for using the cover 100. In this exemplary method, the cover 100 can have the shape depicted in FIGS. 1A-1B, the shape depicted in FIGS. 2A-2B, or have any other desired shape. In operation, the wide section 112 of the extension member 104 can be folded onto or moved toward the body section 102 as shown in FIG. 6A, then be partially folded back again as shown in FIG. 6B. In some embodiments, the fastening components 114 on the bottom surface 108 of the extension member 104 can be selectively mated with corresponding fastening components 114 on the upper surface 106 of the body section 102, as shown in FIG. 6B. In FIG. 6B, the fastening components 114 on the extension member 104 are shown as being selectively coupled with the bottom two fastening components 114 on the body section 102, however the extension member 104 can alternatively be coupled with the upper two fastening components 114 on the body section 102 to place the cover in a different configuration. In alternate embodiments, such as in the embodiments shown in FIGS. 5A-5B, the fastening components 114 on the bottom surface 108 of the extension member 104 can be selectively coupled with any desired location on the upper surface 106 of the body section 102.

As shown in FIG. 6C, after the extension member 104 has been selectively coupled with the body section 102, the cover 100 can be in a substantially bucket-shaped configuration. The cover 100 in the bucket-shaped configuration can have gaps 124 on either side of the thin section 110 between the wide section 112 and the body section 102, as shown in FIG. 6C. The gaps 124 can be wide enough to accommodate a child's legs.

Figure 7:
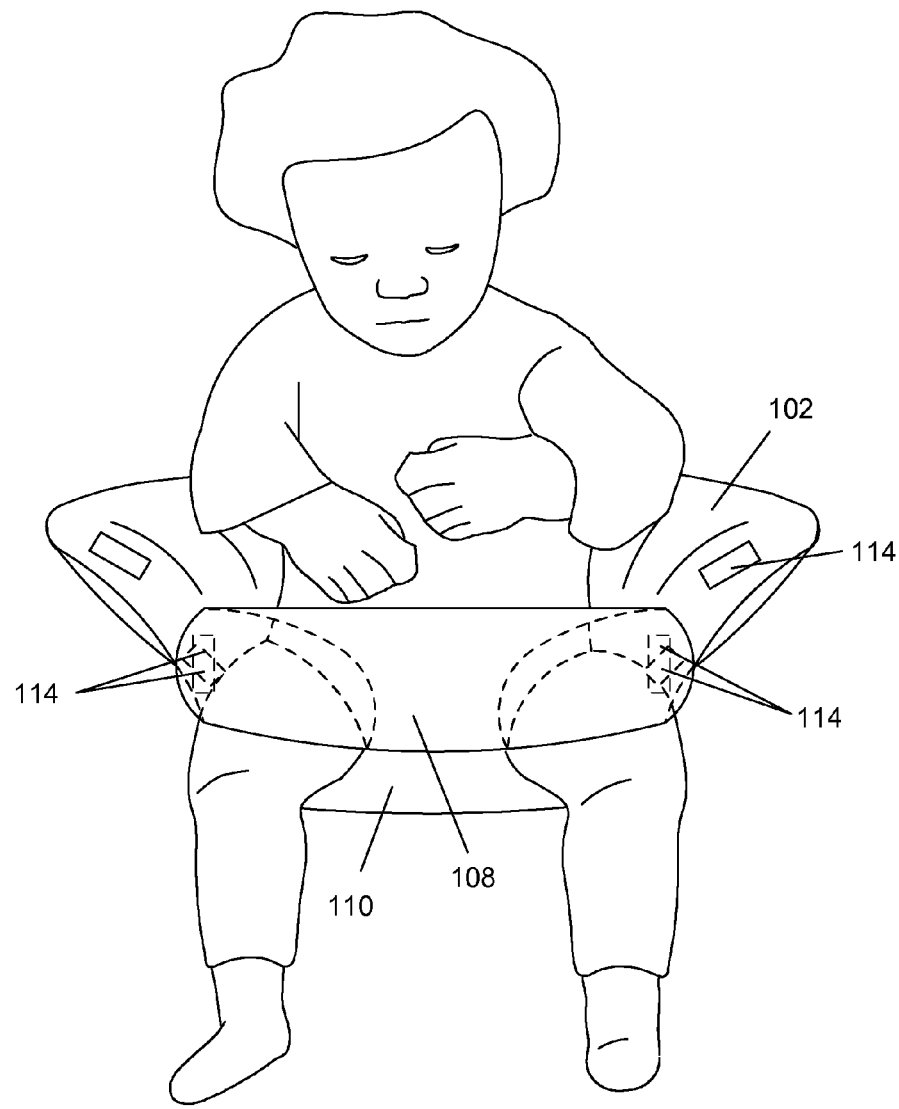
FIG. 7 depicts an embodiment of a cover in use with a child.

As shown in FIG. 7, a child can be placed in the cover 100, with the child's rear end sitting on the body section 102, the child's legs extending through the gaps 124, the thin section 110 extending between the child's legs, and the wide portion 112 of the extension member 104 above and/or in front of the child. The cover 100 in FIG. 7 can have the shape depicted in FIGS. 1A-1B, the shape depicted in FIGS. 2A-2B, or have any other desired shape.

When in the substantially bucket-shaped configuration, the cover 100 can substantially conform to a child's seat. The cover 100 can be placed within the child's seat before or after a child is placed in the cover 100. In some embodiments, the cover 100 can be placed in the seat such that the gaps 124 of the cover 100 are aligned with the leg openings of the seat. The cover 100 can provide a protective barrier between the child and the seat.

Figure 8:
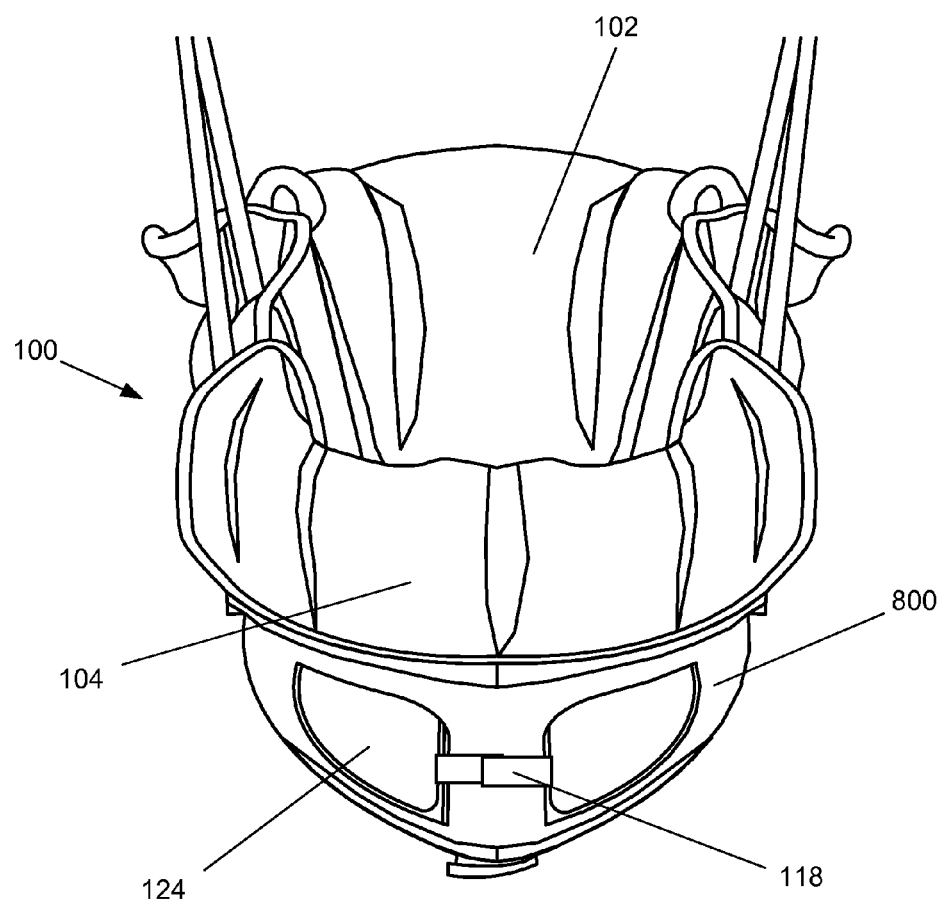
FIG. 8 depicts an embodiment of a cover in use with a bucket swing.
Figure 10:
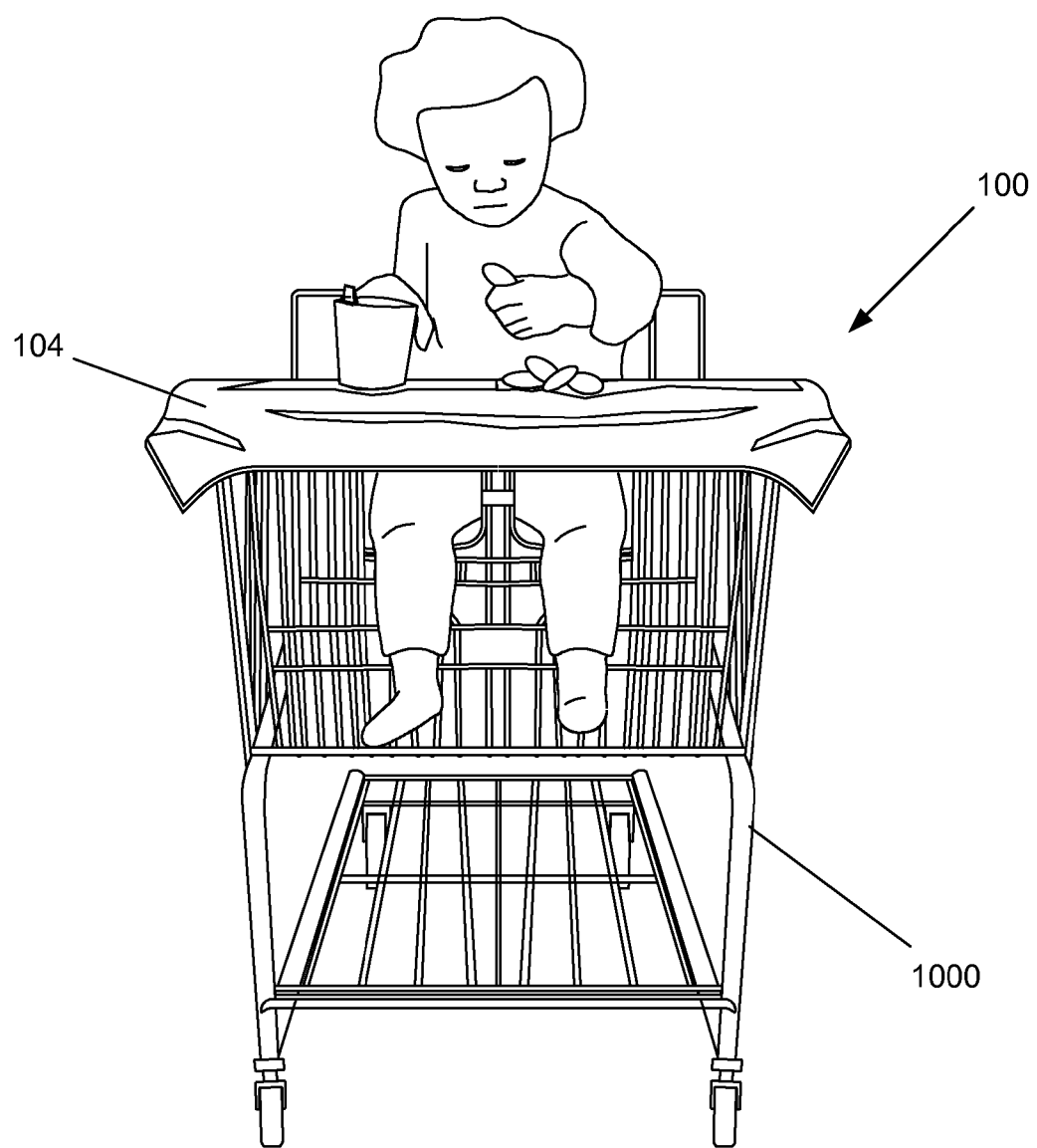
FIG. 10 depicts an embodiment of a cover in use with a shopping cart.

By way of a non-limiting example, FIG. 8 depicts the cover 100 positioned within a bucket swing seat 800. The cover 100 in FIG. 8 can have the shape depicted in FIGS. 1A-1B, the shape depicted in FIGS. 2A-2B, or have any other desired shape. The extension member 108 can extend up and over the front of the bucket swing seat 800, and the body section 102 can line the inside of the bucket swing seat 800. The gaps 124 can be positioned to align with the leg openings of the bucket swing seat 800. In some embodiments, the seat fasteners 118 can be selectively attached to or around a portion of the bucket swing seat 800, such as the strip between the leg openings. Similarly, the cover 100 can be used in the bucket-shaped configuration in a high chair seat 900 as shown in FIG. 9, a shopping cart seat 1000 as shown in FIG. 10, or any other type of seat that has leg openings through which a child's legs can pass. The cover 100 in FIGS. 9 and 10 can have the shape depicted in FIGS. 1A-1B, the shape depicted in FIGS. 2A-2B, or have any other desired shape.

The cover 100 can also be used without coupling the fastening components 114 of the extension member 104, by laying the cover 100 within a seat or on a flat surface to provide a protective barrier between the child and the seat or other surface. The cover 100 can have the shape depicted in FIGS. 1A-1B, the shape depicted in FIGS. 2A-2B, or have any other desired shape. By way of a non-limiting example, as shown in FIG. 10 in some situations the fastening components 114 can be connected and the extension member 104 can be placed over the front of the shopping cart seat such that the leg opening of the shopping cart seat 1000 match up with the gaps 124 of the cover 100 in the bucket-shaped configuration, while in other situations the cover 100 can be draped over the shopping cart seat 1000 without being in the bucket-shaped configuration. The cover 100 can extend over the handle bars of the shopping cart 1000, thereby providing a protective surface on which a user can place food, toys, pacifiers, or any other known and/or convenient item.

Figure 11:
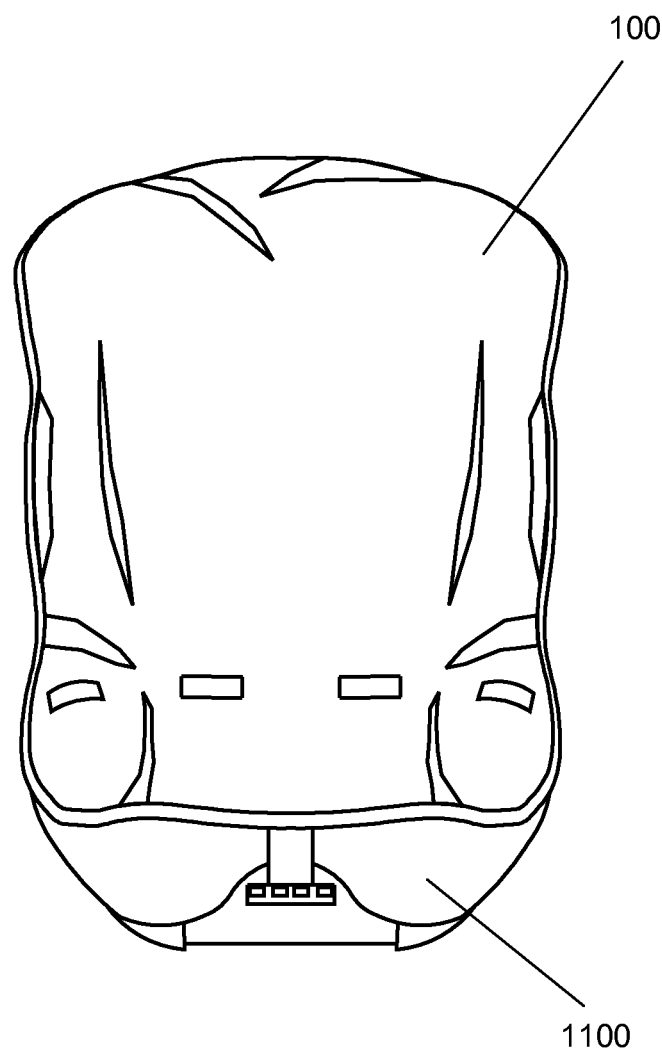
FIG. 11 depicts an embodiment of a cover in use with a car seat.

Similarly, the cover 100 can be used to line the interior of a car seat 1100 without coupling the fastening components 114 of the extension member 104 with the body section 102. By way of a non-limiting example, the cover 100 can be draped over the car seat 1100 when the car seat 1100 is not in use, as shown in FIG. 11, thus preventing the car seat 1100 from getting too hot when exposed to the sun or extreme heat. The cover 100 in FIG. 11 can have the shape depicted in FIGS. 1A-1B, the shape depicted in FIGS. 2A-2B, or have any other desired shape. The cover 100 can also be used on the seat of the car seat 1100 to provide a protective barrier between a child and the surface of the car seat 1100.

In yet other embodiments, the cover 100 can be used in conjunction with a stroller, either as a barrier between a child and the seat of a stroller, or as a cover to drape over the top of a stroller to block harmful UV rays, rain, or other elements from a child. Moreover, the cover 100 can be used in a substantially planar configuration as a diaper changing pad, a play mat, or a placemat. The cover 100 can also be placed on a horizontal surface in a planar position and a child can sit on the cover 100. The cover 100 can also be used in any other known and/or convenient manner or configuration.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A protective cover, comprising:
   a flexible planar body having a body section and an extension member extending from a perimeter edge of said body section, said flexible planar body having a top surface and a bottom surface, and said extension member having a wide portion and a thin portion extending between said wide portion and said body section;
   a plurality of top fasteners coupled with said body section on said top surface;
   a first lower fastener coupled with said wide portion of said extension member on said lower surface;
   a second lower fastener coupled with said wide portion of said extension member on said lower surface;
   wherein said first lower fastener and said second lower fastener are each configured to selectively mate with any one of said plurality of said top fasteners, such that the lower surface of said wide portion of said extension member is selectively coupled with the upper surface of said body portion to form a bucket shaped configuration.

2. The protective cover of claim 1, wherein said flexible planar body is configured to be in an open configuration when said first lower fastener and said second lower fastener are not selectively mated with any of said plurality of said top fasteners, and in said bucket shaped configuration when said first lower fastener and said second lower fastener are each selectively mated with a member of said plurality of said top fasteners.

3. The protective cover of claim 1, wherein the shape of said bucket shaped configuration is different when said first lower fastener and said second lower fasteners are selectively mated with a first subset of said plurality of said top fasteners than when said first lower fastener and said second lower fasteners are selectively mated with a second subset of said plurality of said top fasteners.

4. The protective cover of claim 1, wherein said thin portion and said wide portion of said extension member form a mushroom shape.

5. The protective cover of claim 1, further comprising a seat fastener extending away from said thin portion of said extension member.

6. The protective cover of claim 1, wherein said body section has a substantially circular shape.

7. The protective cover of claim 1, wherein said flexible planar body comprises a lower outer layer, an inner layer, and an upper outer layer.

8. The protective cover of claim 7, wherein said inner layer comprises insulating material configured to reduce thermal transfer through said inner layer.

9. The protective cover of claim 8, wherein said insulating material comprises a plurality of hollow fibers needle-punched through a nonwoven substrate and through a reflective metalized poly film.

10. The protective cover of claim 1, wherein gaps wide enough for a child's legs are positioned between said wide portion and said body section on both sides of said thin portion.

11. The protective cover of claim 10, wherein said gaps are configured to be aligned with leg openings in a child's seat when said body section and said extension member are in said bucket shaped configuration.

12. A protective cover, comprising:
a flexible planar body having a body section and an extension member extending from a perimeter edge of said body section, said flexible planar body having a top surface and a bottom surface, and said extension member having a wide portion and a thin portion extending between said wide portion and said body section;
a first lower fastener coupled with said wide portion of said extension member on said lower surface;
a second lower fastener coupled with said wide portion of said extension member on said lower surface;
wherein said first lower fastener and said second lower fastener are each configured to selectively mate with said top surface of said body section, such that the lower surface of said wide portion of said extension member is selectively coupled with the upper surface of said body portion to form a bucket shaped configuration.

13. The protective cover of claim 12, wherein said first lower fastener and said second lower fastener are portions of adhesive tape.

14. The protective cover of claim 12, further comprising one or more markings on said top surface of said body section, wherein said markings are indicia of locations at which said first lower fastener and said second lower fastener are configured to be coupled with said upper surface of said body portion.

* * * * *